US010394923B2

(12) United States Patent
Kersting

(10) Patent No.: US 10,394,923 B2
(45) Date of Patent: Aug. 27, 2019

(54) PLATFORM APPARATUS FOR ACTIVELY DISTRIBUTED QUANTITATIVE COLLECTIVE KNOWLEDGE

(71) Applicant: Patrick Faulwetter, Marina Del Rey, CA (US)

(72) Inventor: Björn Kersting, Braunfels (DE)

( * ) Notice: Subject to any disclaimer, the term of this patent is extended or adjusted under 35 U.S.C. 154(b) by 396 days.

(21) Appl. No.: 15/100,440

(22) PCT Filed: Jun. 26, 2014

(86) PCT No.: PCT/DE2014/100213

§ 371 (c)(1),
(2) Date: Nov. 7, 2016

(87) PCT Pub. No.: WO2015/078437

PCT Pub. Date: Jun. 4, 2015

(65) Prior Publication Data

US 2017/0169121 A1 Jun. 15, 2017

(30) Foreign Application Priority Data

Nov. 28, 2013 (WO) ................ PCT/DE2013/100399

(51) Int. Cl.
*G06F 16/955* (2019.01)
*G06F 16/954* (2019.01)
(Continued)

(52) U.S. Cl.
CPC .......... *G06F 16/955* (2019.01); *G06F 16/285* (2019.01); *G06F 16/954* (2019.01);
(Continued)

(58) Field of Classification Search
CPC ............... G06F 17/24; G06F 17/30861; G06F 17/30867; G06F 16/955; G06F 16/9535;
(Continued)

(56) References Cited

U.S. PATENT DOCUMENTS 8,612,449 B1 * 12/2013 Cuthbert ............ G06Q 30/0603 707/740
9,613,321 B2 * 4/2017 Molyneux .............. G06Q 10/00
(Continued)

FOREIGN PATENT DOCUMENTS

WO 2013/029602 A1 3/2013
WO 2013/029605 A1 3/2013

OTHER PUBLICATIONS

BSCW 4.4 Manual, OrbiTeam Software GmbH & Co. KG, Bonn, Germany, Nov. 2008 (Year: 2008).*
(Continued)

*Primary Examiner* — Hasanul Mobin
(74) *Attorney, Agent, or Firm* — Bachman & LaPointe, P.C.

(57) ABSTRACT

In the case of a platform device (100) located at a web-site and capable of forming a network with a plurality of ID-detectable users or participants for gathering and processing items of information stored in memory spaces (110) of a platform (100) which are in each case code-identifiable and assigned to a plurality of different topics, there takes place an automated distribution of items of information collected by the users or participants in that the storage spaces (110) on the platform (100) are in each case formed by a dual unit (DuU), a dual unit (DuU) comprising in each case a first storage space (111) assigned to a predefined topic and provided with initial information (114) formulated by an initial participant but not editable by any other individual user or participant, together with a second storage space (112) that is assigned to the first storage space (111) and is editable by any one individual user or participant and is construed for the importation, by the plurality of users or participants, of supplementary information (113) concerning the initial information (114) stored in the first space (111).

14 Claims, 1 Drawing Sheet

(51) Int. Cl.

*G06F 16/9535* (2019.01)
*G06F 16/28* (2019.01)
*G06F 16/958* (2019.01)
*G06Q 10/10* (2012.01)
*G06N 5/02* (2006.01)

(52) U.S. Cl.

CPC ........ *G06F 16/9535* (2019.01); *G06F 16/986* (2019.01); *G06N 5/022* (2013.01); *G06Q 10/101* (2013.01)

(58) Field of Classification Search

CPC .... G06F 16/954; G06F 16/986; G06F 16/285; G06Q 10/103

See application file for complete search history.

(56) References Cited

U.S. PATENT DOCUMENTS

2002/0049738 A1* 4/2002 Epstein ............. G06F 17/30864
2004/0266743 A1* 12/2004 McMahon ............. A61K 45/06 514/171
2005/0097188 A1* 5/2005 Fish .................... G06F 16/3338 709/217
2005/0223002 A1* 10/2005 Agarwal ........... G06F 17/30864
2006/0282304 A1* 12/2006 Bedard .................. G06Q 30/02 705/7.33
2007/0061211 A1* 3/2007 Ramer .................. G06Q 20/12 705/25
2008/0201418 A1* 8/2008 Krishnan .......... G06F 17/30861 709/204
2010/0205006 A1* 8/2010 Bergh ............... G06F 17/30861 705/3
2010/0205543 A1* 8/2010 Von Werther ....... H04L 12/1818 715/753
2011/0016179 A1* 1/2011 Bechtel .................. G06Q 10/10 709/205
2011/0178981 A1* 7/2011 Bowen .................. G06Q 10/00 707/608
2013/0159289 A1* 6/2013 Matthews .......... G06Q 10/0635 707/722
2014/0181210 A1 6/2014 Kersting
2014/0310285 A1* 10/2014 Chan ..................... G06F 9/4881 707/740
2014/0330831 A1 11/2014 Kersting
2014/0365457 A1 12/2014 Kersting et al.
2014/0372432 A1 12/2014 Kersting
2015/0347480 A1* 12/2015 Smart ................. G06F 16/2264 707/743

OTHER PUBLICATIONS

Basic Support for Cooperative Work, Version 4.4, Oct. 2007, OrbiTeam Software GmbH & Co. KG, Bonn, Germany.
International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.

* cited by examiner

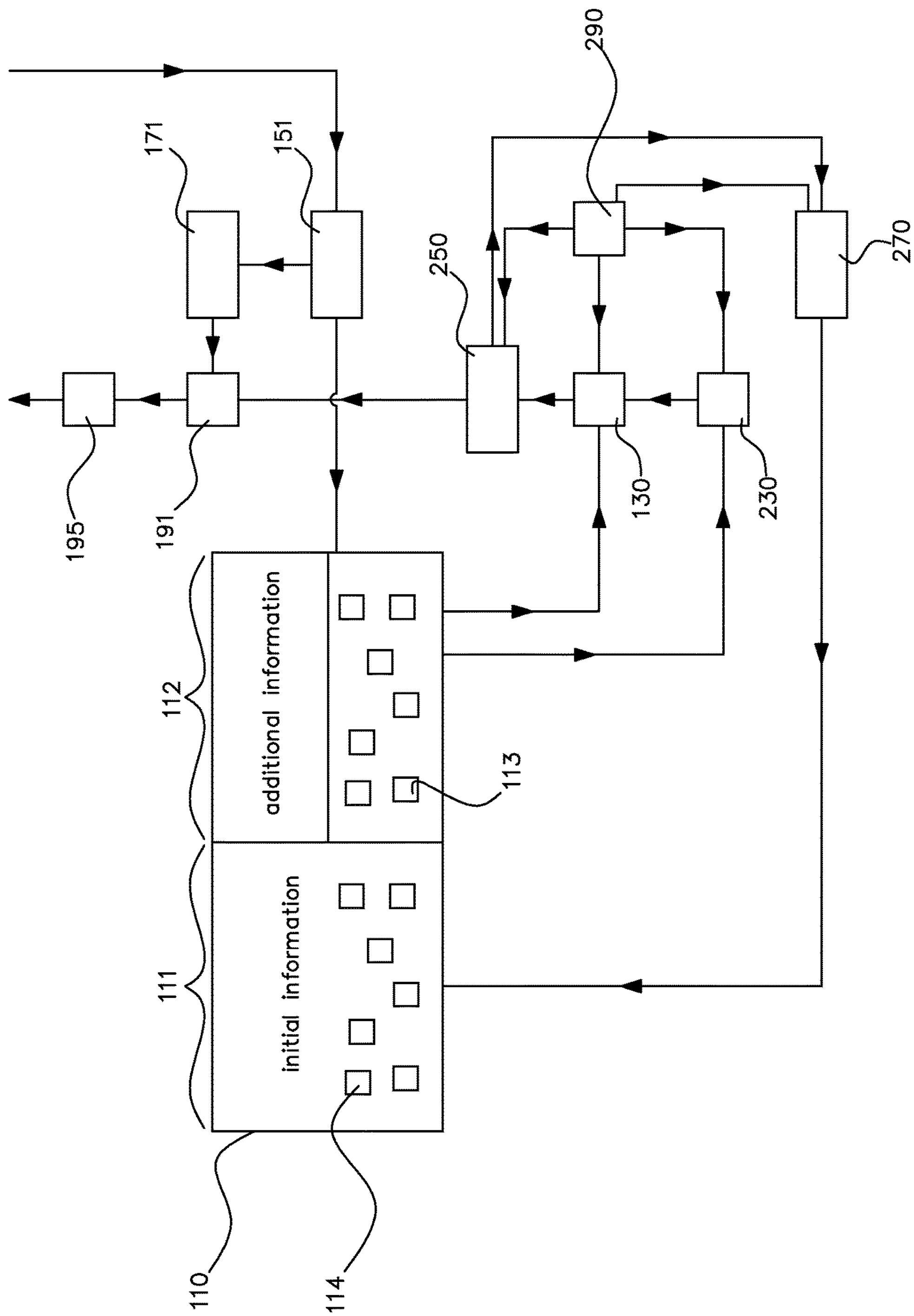
290
171
151
250
270
195
191
130
230
additional information
112
113
initial information
111
110
114

PLATFORM APPARATUS FOR ACTIVELY DISTRIBUTED QUANTITATIVE COLLECTIVE KNOWLEDGE

BACKGROUND

The present invention relates to a platform device located at a web-site and capable of forming a network with a plurality of ID-detectable users or participants for gathering and processing, by the users or participants, of items of information stored in memory spaces of a platform which are in each case code-identifiable and assigned to a plurality of different topics.

Platform devices of the type mentioned above are known in the prior art for a number of applications. They are operated, inter alia, in the world-wide internet. The prior platform devices suffer from the disadvantage that it is not possible to select predefinable links and at the same time links according to predefinable criteria. One reason for this may be regarded as being the fact that the current platforms store items of information, without these items of information being attributed to strictly predefinable processing criteria and to strictly predefinable evaluation criteria.

Moreover, the prior platform devices are not efficient in the distribution of collective knowledge.

SUMMARY

Thus it is an object of the present invention to provide a platform device by means of which items of information stored in a first memory can be evaluated by the network participants according to strictly predefinable processing criteria and can be supplemented or amended in some other manner and by means of which an effective automated distribution of, in particular, an item of qualitative information representing collective knowledge is enabled.

With regard to a platform device of the type mentioned above this object is achieved in that the storage spaces on the platform are in each case formed by a dual unit (DuU), a dual unit (DuU) comprising in each case a first storage space assigned to a predefinable topic and provided with initial items of information formulated by an initial participant but not editable by any other individual user or participant, together with a second storage space which is assigned to the first storage space and is editable by each individual user or participant and is construed for importation, by the plurality of users or participants, of supplementary information concerning the initial item of information stored in the first storage space, an identifying device being provided for the purpose of identifying all users or participants that have imported an item of supplementary information to a predefined storage space, with respect to the identifier thereof, and to store the same in a user-participant register, such that, when an importation of a new item of supplementary information to the second storage space is carried out by any one user or participant thus identified by means of an activation unit, an automated transmission unit (DuU-feed) containing the new item of supplementary information transmits at least part of the contents of the associated dual unit to at least some of the other users or participants registered in the user-participant register, this being carried out by means of an appropriate transmitting unit.

Preferred embodiments of the invention are subject matter of the subclaims.

In the case of the platform device of the invention, as a result of the combination of features to the effect that the storage spaces on the platform are in each case formed by a dual unit (DuU), a dual unit (DuU) in each case comprising a first storage space assigned to a predefinable topic and provided with initial items of information formulated by an initial participant, the first storage space not being editable by any other individual user or participant, together with a second storage space which is assigned to the first storage space and is editable by any individual user or participant and is construed for the importation, by the plurality of users or participants, of supplementary information concerning the initial item of information stored in the first storage space, wherein an identifying device is provided for the purpose of identifying all users or participants that have imported an item of supplementary information to a predefined storage space, with respect to the identifier thereof, and for storing the same in a user-participant register, such that, when a new item of supplementary information is imported to the second storage space by any one user or participant, the said item being identified by means of an activation unit, a the new item of supplementary information containing an actively automated transmission unit (DuU-feed), at least part of the contents of the associated dual unit is transmitted to at least some of the other registered users or participants registered in the user-participant register by means of an appropriate transmitting unit, there being achieved a situation such that, on account of the fact that the dual units are formed and contain items of information, particularly those representing a quantitative item of information, that are stored according to very specific processing stipulations making them processable, amendable and finally storable, so that the items of information provided in the form of individual evaluations, individual supplements, and individual comments form a type of collective knowledge which, by means of strictly predefinable criteria, become actively transferable to a predeterminable number of users or participants per automated transmission unit (DuU-feed).

The objective of a processing operation that can be implemented by the plurality of users or participants is primarily to make an initial item of information imported by an initial author to a first storage space of a dual unit utilizable and processable by other users or participants, in order to provide the initial item of information with a reliability rating or alternatively, a reliability evaluation, which is placed in the first storage space on conclusion of a processing operation carried out in accordance with the invention and represents, for all interested persons, a collective value clearly defined by the users or participants.

According to a first preferred embodiment of the device of the invention provision is made such that supplementary information can be imported to the editable second storage space by the users or participants in the form of evaluations of the items of information stored in the first storage space, an evaluation being defined as the number of predefined importations placed in the second storage space by the users or participants.

A transmission unit (DuU-feed) containing the new item of supplementary information can in this instance only comprise the contents of the first storage space or, depending on the presetting, alternatively comprise the contents of a first storage space together with the contents of the second storage space assigned to the first storage space.

In addition, provision may be made for a transmission unit (DuU-feed) containing the new item of supplementary information to be valid with respect to all other registered users or participants registered in the user-participant register.

Alternatively, the identifiers of the identified users or participants can be suitably adapted to form predetermined sub-groups of users or participants so as to provide a user-participant-filter incorporating the identifiers, in order to transmit only specified transmission units (DuU-feeds) to users or participants of one or more predefined sub-groups.

Examples of criteria for the formation of sub-groups of users or participants include features such as age, sex, regional location, accumulation of certain predefined web activities, inclinations and documented interests, etc. of the individual user or participant.

A transmission (DuU-feed) to the identifier of an identified user or participant preferably takes place with respect to a transmitting unit activated by the import of the relevant further item of supplementary information for the purpose of creating an information link to other registered users or participants stored in the user-participant register.

According to an important preferred embodiment of the device of the invention provision is made such that in the editable second storage space items of supplementary information can be provided by the users or participants in the form of individual evaluations of the items of information stored in the first storage space, at least one adding device being provided for the purpose of counting the imported individual evaluations, together with a memory provided in the second storage space for the purpose of saving the number of counted individual evaluations, wherein an individual evaluation can be provided on the part of the users or participants by effecting a predefined importation, a collective value being defined as the number of predefined importations placed by the users or participants in the second storage space.

According to an important preferred embodiment of the device of the invention provision is made such that in the editable second storage space items of supplementary information can be provided by the users or participants in the form of individual evaluations of the items of information stored in the first storage space, at least one adding device being provided for the purpose of counting the imported individual evaluations, together with a memory provided in the second storage space for the purpose of saving the number of counted individual evaluations, wherein an individual evaluation can be provided on the part of the users or participants by effecting a predefined importation, a collective value being defined as the number of predefined importations carried out by the users or participants into the second storage space.

In this case, there is preferably provided a first adding device for the purpose of counting the individually imported positive evaluations, together with a memory for the purpose of saving this number to the second storage space, and there is provided a second adding device for the purpose of counting the individually imported negative evaluations, together with a memory for the purpose of saving this number to the second storage space, while an individual evaluation can be provided by the users or participants by means of a predefined importation, and a positive collective value being defined as the number of predefined importations to the second storage space that correspond to a positive evaluation and a negative collective value being defined as the number of predefined importations to the second storage space that correspond to a negative evaluation.

Furthermore, a first adding device is preferably provided that adds the positive evaluations stored in the second storage space to a first number while a second adding device adds the negative evaluations stored in the second storage space to a second number, a first dividing device being provided so as to state the ratio of the first and second numbers in the form of a percentage value.

According to a further preferred embodiment of this device of the invention, a copying device is provided, which on elapse of settable time intervals successively interprets the evaluations stored in the second storage space as being useful items of information and transfers the same to the first storage space while overwriting the relevant previous items of information in the first storage space.

Furthermore, a timing device can be provided, which transmits, within predefined constant periods of time, reset signals to the first and second adding devices and to the first dividing device and the copying device so as to set the associated devices to zero on conclusion of a respective presettable time interval and to repeat the currently assigned function in an immediately following time-period of equal length.

A predefined importation can be realized, for example in the case of an individual positive evaluation, by the importation of the Western Arabic numeral '+1', and a predefined importation can be realized, for example in the case of an individual negative evaluation, by importation of the Western Arabic numeral '−1'.

Furthermore, preferably any one of the participants is entitled to an initial placement of a dual unit having a first and second storage space.

BRIEF DESCRIPTION OF THE DRAWINGS

The platform device of the invention is explained below with reference to a preferred embodiment, which is illustrated in the FIGURE of the accompanying drawing.

FIG. 1 shows a theoretical embodiment of a dual unit (DuU) according to a preferred embodiment of the invention in the form of a block diagram.

DETAILED DESCRIPTION

The platform device 100 of the invention placed on a web-site is capable of forming a network with a plurality of ID-detectable users or participants and construed for gathering and processing items of information stored in a plurality of in each case code-identifiable and in each case topic-dependent memory spaces 110 of a platform on the part of the users or participants.

The storage spaces subdivided into a large number of different topics 110 are formed on the platform 100 in each case by a dual unit (DuU), a dual unit (DuU) in each case comprising a first storage space 111 assigned to a predefined topic and provided with initial information 114 formulated by an initial participant but not editable by any other individual user or participant, together with a second storage space 112 assigned to the first storage space 111 and editable by any one individual user or participant and being construed for importation, by the plurality of users or participants, of supplementary information 113 relevant to the initial information 114 stored in the first storage space 111.

In this case, an identifying device 151 is provided for the purpose of identifying all users or participants contributing supplementary information 113 to a prescribed storage space 110 with respect to the identifier thereof and saving the same to a user-participant register 171 for the purpose of undertaking, on importation of a new item of supplementary information 113 to the second storage space 112 by any one of the identified users or participants, an automated transmission unit (DuU-feed) containing the new supplementary item of information 113 of at least part of the associated dual unit to at least some of the other registered users or participants stored in the user-participant register 171, by means of a transmitting unit 195 provided for this purpose.

The identification codes of the identified users or participants are suitable for the purpose of forming predetermined sub-groups of users or participants for the purpose of creating user-participant filters incorporating the identification codes and for the purpose of using only specified transmission units (DuU-feeds) to users or participants of one or more predefined sub-groups.

Examples of criteria for the formation of sub-groups of users or participants are in this case age, sex, local accumulation, increase of defined web activities etc. of the individual user or participant.

A transmission (DuU-feed) to the identifier of an identified user or participant takes place by means of a transmitting unit 195 for the creation of an information link to other registered users or participants stored into the user-participant register activated by the importation of a respective further item of supplementary information 113.

In the editable second storage space 112, supplementary information 113 in the form of individual evaluations of the items of information stored in the first space 111 can be imported by the users or participants, at least one adding device 130 being provided for the purpose of counting the individual evaluations imported, together with a memory provided in the second storage space 112 for the purpose of saving the number of counted individual evaluations, an individual evaluation on the part of the users or participants being possible by effecting a predefined importation, a swarm value being defined as the number of predefined importations carried out by the users or participants to the second storage space 112.

In the editable second storage space 112 supplementary information 113 in the form of individual evaluations of the items of information stored in the first space 111 can be imported by the users or participants, at least one adding device 130 being provided in the second storage space 112 for the purpose of counting the individual evaluations imported, together with a memory in the second storage space 112 for the purpose of saving the number of counted individual evaluations, an individual evaluation on the part of a user or participant being possible by effecting a predefined importation, a swarm value being defined as the number of predefined importations carried out by the users or participants to the second storage space 112.

A first adding device 130 is provided for the purpose of counting the individually imported positive evaluations, together with a memory for the purpose of saving this number to the second storage space 112, and a second adding device 230 is provided for the purpose of counting the individually imported negative evaluations, together with a memory for the purpose of saving this number to the second storage space 112, and an individual evaluation is made possible for the users or participants by means of a predefined importation, while a positive swarm value is defined as the number of predefined importations to the second storage space 112 that correspond to a positive evaluation, and a negative swarm value is defined as the number of predefined importations to the second storage space 112 that correspond to a negative evaluation. (Quantitative evaluation)

The first adding device 130 summates the positive evaluations stored in the second space 112 to form a first number, the second adding device 230 summates the negative evaluations stored in the second storage space 112 to form a second number, a first dividing device 250 being provided in order to state the ratio of the first and second numbers in the form of a percentage value.

Furthermore, a copying device 270 is provided which, on elapse of settable time intervals, successively interprets the evaluations stored in the second space 112 as being useful items of information and transfers the same to the first storage space 111 while overwriting the relevant previous items of information in the first storage space 111.

A timing device 290 is provided, which, in predefined constant periods of time, transmits reset signals to the first adding device 130 and to the second adding device 230, and also to the first dividing device 250 and to the copying device 270, in order to set the associated devices to zero on conclusion of a respective presettable time interval and to repeat the currently assigned function in an immediately following time-period of equal length.

In the case of an individual positive evaluation, a predefined importation can be realized by importation of the Arabic number '+1', and in the case of an individual negative evaluation, a predefined importation can be denoted by inclusion of the Western Arabic numeral '−1'.

Each of the users or participants is entitled to make an initial placement of a dual unit having a first storage space 111 and a second storage space 112, as initial user or participant.

The aforementioned exemplary embodiment of the invention merely serves the purpose of providing a better understanding of the teaching of the invention as prescribed by the claims, which teaching is not, as such, restricted to the exemplary embodiment.

What is claimed is:

1. One or more servers hosting a web site, the web site comprising:

a platform device capable of forming a network with a plurality of ID-detectable users or participants for gathering and processing, by the users or participants, of items of information stored in storage spaces in a memory which are in each case code-identifiable and assigned to a plurality of different topics, wherein the platform device comprises:

the storage spaces each being formed by a dual unit (DuU), each said dual unit (DuU) comprising:

a first storage space assigned to a predefined topic and provided with initial information formulated by an initial participant but not editable by any other individual user or participant;

a second storage space assigned to the first storage space, which is editable by any one individual user or participant and is construed for the importation, by the plurality of users or participants, of supplementary information concerning the initial information stored in the first storage space;

an identifying device for identifying all users or participants that contribute supplementary information to a prescribed storage space, with respect to the identifier thereof, and for storing the same in a user-participant register, such that, when an importation of a new item of supplementary information to the second storage space is carried out by any one of the users or participants thus identified by means of an activation unit, an automated transmission unit (DuU-feed) containing the new item of supplementary information transmits at least part of the associated dual unit to at least some of the other registered users or participants registered in the user-participant register, wherein:

in the editable second storage space supplementary information is imported by the users or participants in the form of individual evaluations of the items of information stored in the first space, at least one adding device being provided for the purpose of counting the individual evaluations imported, together with a memory provided in the second storage space for the purpose of saving the number of counted individual evaluations, wherein an individual evaluation on the part of the users or participants is carried out by effecting a predefined importation, a swarm value being defined as the number of predefined importations introduced by the users or participants into the second storage space;

a first adding device is provided for the purpose of counting the imported individual positive evaluations, together with a memory for the purpose of saving this number to the second storage space, and a second adding device is provided for the purpose of counting the individually imported negative evaluations, together with a memory for the purpose of saving this number to the second storage space, it being possible for an individual evaluation to be made by the users or participants by means of a predefined importation, while a positive swarm value is defined as the number of predefined importations to the second storage space that correspond to a positive evaluation, a negative swarm value being defined as the number of predefined importations to the second storage space that correspond to a negative evaluation; and the first adding device adds the positive evaluations stored in the second space to a first number and a second adding device adds the negative evaluations stored in the second space to a second number, while a first dividing device is provided for the purpose of stating the ratio of the first and second numbers in the form of a percentage value.

2. The one or more servers as claimed in claim 1, wherein supplementary information in the form of quantitative evaluations of the items of information stored in the first space are inscribable in the editable second storage space on the part of the users or participants, a quantitative evaluation being defined as the number of predefined importations to the second storage space undertaken by the users or participants.

3. The one or more servers as claimed in claim 1, wherein supplementary information in the form of individual evaluations of the items of information stored in the first storage space is provided in the editable second storage space by the users or participants, at least one adding device being provided in the second storage space for the purpose of counting the individual evaluations imported, together with a memory serving the purpose of saving the number of counted individual evaluations, wherein an individual evaluation on the part of the users or participants is carried out by effecting a predefined importation, a swarm value being defined as the quantitative amount (number) of the predefined importations carried out on the part of the users or participants in the second storage space.

4. The one or more servers as claimed in claim 1, wherein a said automated transmission unit (DuU-feed) containing the new supplementary information comprises only the contents of the first storage space.

5. The one or more servers as claimed in claim 1, wherein the new supplementary information contained in the automated transmission unit (DuU-feed) comprises the contents of a first storage space, together with the contents of the second storage space assigned to the first storage space.

6. The one or more servers as claimed in claim 1, wherein the new supplementary information contained in the automated transmission unit (DuU-feed) is transmitted to all other registered users or participants registered in the user-participant register.

7. The one or more servers as claimed in claim 1, wherein the identification codes of the identified users or participants are suitable for the purpose of forming predetermined sub-groups of users or participants in order to create user-participant filters using the identification codes such that only specified said automated transmission units (DuU-feeds) are transmitted to users or participants of one or more predefined sub-groups.

8. The one or more servers as claimed in claim 7, wherein the criteria for the formation of sub-groups of users or participants include age, sex, regional accumulation, increase of predefined web activities etc. of the individual user or participant.

9. The one or more servers as claimed in claim 1, wherein a said automated transmission unit (DuU-feed) to the identifier of an identified user or participant takes place by means of a transmitting unit for the creation of an information link to other registered users or participants present in the user-participant register activated by the importation of a respective further importation of supplementary information.

10. The one or more servers as claimed in claim 1, wherein a copying device is provided, which on elapse of settable time intervals successively interprets the evaluations stored in the second space that are useful items of information and transfers the same to the first storage space while overwriting the relevant previous items of information in the first storage space.

11. The one or more servers as claimed in claim 10, wherein a timing device is provided, which in predefined constant periods of time transmits reset signals to the first adding device and to the second adding device, and also to the first dividing device and the copying device, in order to set the associated devices to zero on conclusion of a respective presettable time interval and to repeat the currently assigned function in an immediately following time-period of equal length.

12. The one or more servers as claimed in claim 1, wherein a predefined importation in the case of an individual positive evaluation is denoted by insertion of the Western Arabic numeral '+1'.

13. The one or more servers as claimed in claim 1, wherein a predefined importation in the case of an individual negative evaluation is realized by insertion of the Western Arabic numeral '−1'.

14. The one or more servers as claimed in claim 1, wherein any one of the participants is entitled to carry out an initial placement of a dual unit having a first storage space and a second storage space.

* * * * *